Figures 1, 2:
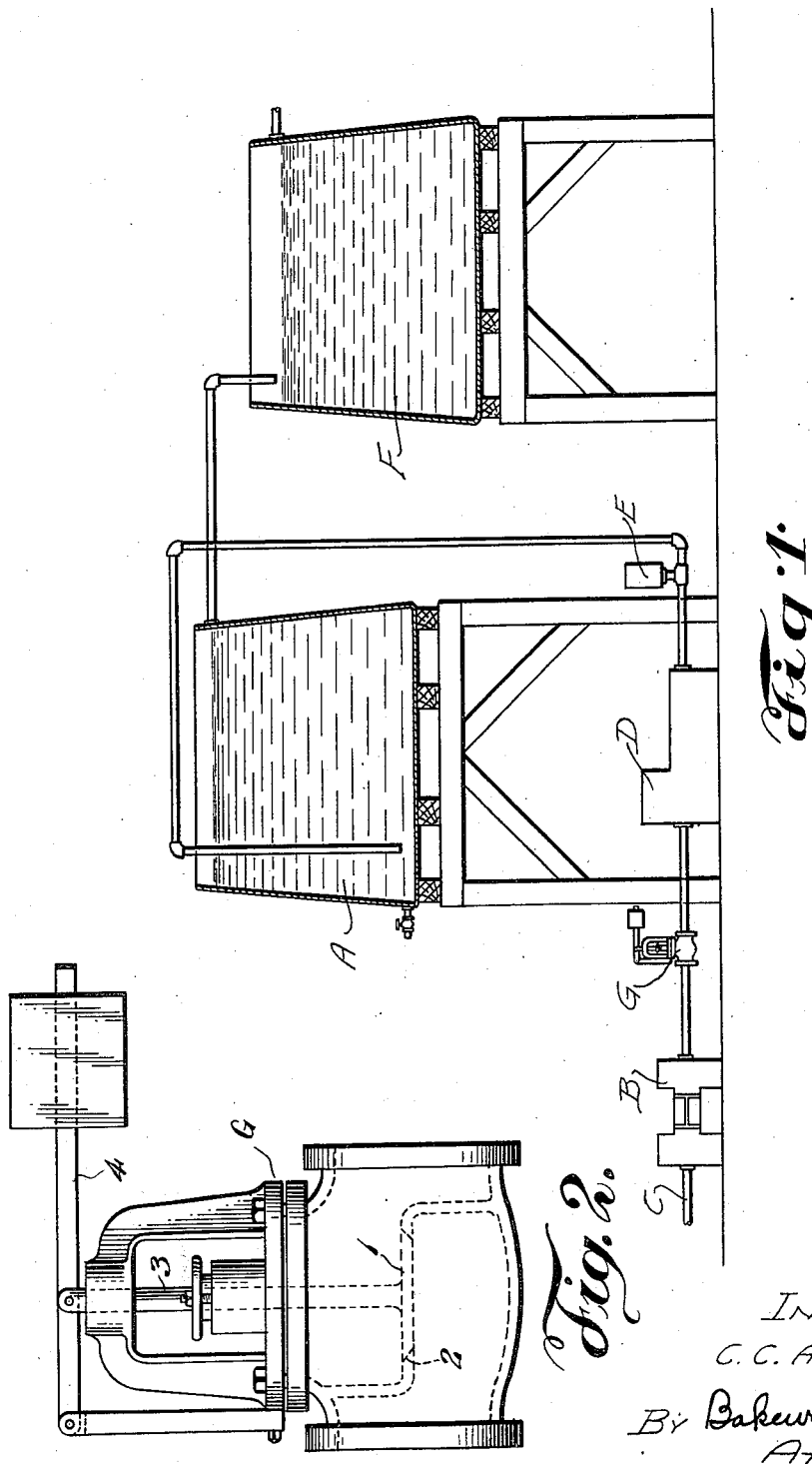

Feb. 15, 1927.
C. C. AVERILL.
1,617,738
PROCESS FOR TREATING PETROLEUM EMULSIONS
Filed Oct. 12, 1925

INVENTOR
C. C. Averill.
By Bakewell & Churst
ATTORNEYS

Patented Feb. 15, 1927.

1,617,738

UNITED STATES PATENT OFFICE.

CHARLES C. AVERILL, OF HOUSTON, TEXAS, ASSIGNOR TO WM. S. BARNICKEL & COMPANY, OF WEBSTER GROVES, MISSOURI, A CORPORATION OF MISSOURI.

PROCESS FOR TREATING PETROLEUM EMULSIONS.

Application filed October 12, 1925. Serial No. 62,039.

This invention relates to the treatment of emulsions of mineral oil and water, such as petroleum emulsions, for the purpose of separating the oil from the water.

Petroleum emulsions are of the water-in-oil type and consist of oil constituting the continuous phase of the emulsion, droplets of water distributed throughout the body of oil and constituting the dispersed phase of the emulsion, and films of matter that encase the droplets of water. They are obtained from producing wells and from the bottom of oil storage tanks and are commonly referred to as "cut oil," "roily oil," "emulsified oil" and "bottom settlings."

The conventional chemical process for "breaking" such emulsions contemplates subjecting the emulsion to the action of a chemical demulsifying agent and then permitting the emulsion to remain in a quiescent state at a suitable temperature so as to cause the water or brine to separate from the oil.

I have discovered that, if an emulsion of mineral oil and water is subjected to an emulsifying action prior to the treatment to "break" the emulsion, the emulsion, in many cases, is rendered more susceptible to treatment. Accordingly, I claim to have discovered a process for breaking emulsions of mineral oil and water that is an improvement on the conventional chemical process used for treating such emulsions, in that it effects a considerable saving in the quantity of chemical demulsifying agent required to break the emulsion.

I am aware of the fact that severe agitation or homogenization ordinarily produces emulsification, and that it is the usual practice in the oil fields to handle petroleum emulsions in such a manner as to prevent violent agitation. Notwithstanding this generally accepted practice, I have proved from numerous tests on various kinds of petroleum emulsions that if the emulsion is conditioned by first subjecting it to an emulsifying operation, it will respond more readily to treatment with a chemical demulsifying agent. One reason for this may be that homogenizing the emulsion increases the interfacial area of the emulsion to such an extent that there is not sufficient emulsifying material in the emulsion to strongly stabilize all of the additional interfacial area that was produced by the emulsifying operation, thereby weakening the emulsion and making it more susceptible to treatment. Or it may be due to the fact that the emulsifying action decreases the distance between the water particles of the emulsion, or decreases the diameter of the water particles, or makes all the water particles of approximately the same uniformly decreased size.

Figure 1 of the drawings is a diagrammatic, side elevational view of a portion of a conventional apparatus for chemically treating petroleum emulsions, provided with a device for subjecting the emulsion to an emulsifying operation so as to condition same prior to introducing the chemical treating agent or demulsifying agent into the emulsion; and Figure 2 is an enlarged side elevational view of the emulsifying device.

Referring to said drawings, A designates a treating tank that is adapted to hold a petroleum emulsion which is undergoing treatment, B designates a pump that is used for drawing the emulsion from a source of supply through a line C and introducing it into the tank A, D designates a heating device in the line C that is used to heat the emulsion, E designates a device that is known commercially as a "Tretelizer" which is used to introduce a chemical treating agent or demulsifying agent into the emulsion flowing into the tank A, so as to cause said emulsion to "break" and separate into its component parts after it has remained in a quiescent state, after treatment, and F designates a storage tank into which the clear or substantially clear oil is drawn from the tank A. The elements above referred to are of well known construction and are now used extensively in treating petroleum emulsions by the Tret-O-Lite process.

Before the emulsion is subjected to the action of the chemical treating agent or demulsifying agent, the emulsion is homogenized or emulsified. This can be effected by any kind of a device or apparatus that will subject the emulsion to an emulsifying operation. In the apparatus herein shown the emulsifying device consists of a valve G arranged in the line C between the pump B and the heater D and adjusted or constructed so that the passage of the emulsion through said valve subjects the emulsion to a vigorous agitation. The type of emulsifying valve G that I have used extensively in the oil fields to condition petroleum emulsions preparatory to subjecting the emulsion to chemical treatment to "break" it, is illustrated in Figure 2 of the drawings and comprises a tapered valve 1 arranged with its peripheral edge spaced away slightly from a tapered valve seat 2, a stem 3 for said valve and a weighted lever 4 connected to said valve stem for holding the valve 1 in adjusted position. The emulsion, in passing through said valve, is subjected to such violent or vigorous agitation that when the emulsion is subsequently acted upon by the demulsifying agent that is used to effect the "breaking" of the emulsion, it will respond to treatment more readily than if it were not subjected to this preliminary step or conditioning step.

Having thus described my invention, what I claim as new and desire to secure by Letters Patent is:

1. A process for treating emulsions of mineral oil and water, characterized by subjecting the emulsion to an emulsifying operation, and thereafter subjecting the emulsion to the action of a demulsifying agent which tends to cause the component parts of the emulsion to separate.

2. A process for "breaking" emulsions of mineral oil and water, consisting in subjecting the emulsion to vigorous agitation so as to homogenize or emulsify the emulsion, thereafter subjecting the emulsion to the action of a suitable chemical demulsifying agent, and subsequently permitting the treated emulsion to remain in a quiescent state.

CHARLES C. AVERILL.